United States Patent
Keshan et al.

(10) Patent No.: US 11,030,605 B2
(45) Date of Patent: Jun. 8, 2021

(54) PEER-TO-PEER MOBILE DEVICE PAYMENT NETWORK

(71) Applicant: VISA INTERNATIONAL SERVICE ASSOCIATION, San Francisco, CA (US)

(72) Inventors: Surendra Keshan, San Francisco, CA (US); Sanjay Sankolli, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 35 days.

(21) Appl. No.: 15/562,702

(22) PCT Filed: Mar. 31, 2016

(86) PCT No.: PCT/US2016/025354
§ 371 (c)(1),
(2) Date: Sep. 28, 2017

(87) PCT Pub. No.: WO2016/161167
PCT Pub. Date: Oct. 6, 2016

(65) Prior Publication Data
US 2018/0060855 A1    Mar. 1, 2018

Related U.S. Application Data

(60) Provisional application No. 62/140,653, filed on Mar. 31, 2015.

(51) Int. Cl.
*G06Q 40/00* (2012.01)
*G06Q 20/22* (2012.01)
(Continued)

(52) U.S. Cl.
CPC ........... *G06Q 20/223* (2013.01); *G06Q 20/12* (2013.01); *G06Q 20/32* (2013.01); *G06Q 20/322* (2013.01);
(Continued)

(58) Field of Classification Search
CPC ...... G06Q 20/233; G06Q 20/12; G06Q 20/23; G06Q 20/20; G06Q 20/32; G06Q 20/40;
(Continued)

(56) References Cited

U.S. PATENT DOCUMENTS 6,867,965 B2 *   3/2005   Khoo ................... G06F 3/0231
                                                             345/168
7,089,214 B2 *   8/2006   Wang ................... G06F 21/606
                                                             705/64
(Continued)

OTHER PUBLICATIONS

J. Gao, K. Edunuru, J. Cai and S. P. D. Shim, "P2P-Paid: A Peer-to-Peer Wireless Payment System," Second IEEE International Workshop on Mobile Commerce and Services, Munich, 2005, pp. 102-111. (Year: 2005).*

(Continued)

*Primary Examiner* — Rajesh Khattar
*Assistant Examiner* — Mohammed H Mustafa
(74) *Attorney, Agent, or Firm* — Loeb & Loeb LLP

(57) ABSTRACT

A computer-implemented method of communicating payment data. The method includes receiving at a server, via a digital communication network, payment data transmitted from a first computing device that is connected to a peer-to-peer network and not in direct communication with the server. The payment data is received directly from a first peer computing device that is in communication with the peer-to-peer network and the server. The method also includes, at the server, analyzing, via one or more processors, the payment data to determine a payment response message. The method also includes transmitting from the (Continued)

server, via the digital communication network, the payment response message to a second peer computing device that is in communication with the server and in communication with the peer-to-peer network. The payment response message is communicated from the second peer computing device to the first computing device through the peer-to-peer network.

15 Claims, 5 Drawing Sheets

(51) Int. Cl.
*G06Q 20/32* (2012.01)
*G06Q 20/12* (2012.01)
*G06Q 20/40* (2012.01)

(52) U.S. Cl.
CPC ....... *G06Q 20/3223* (2013.01); *G06Q 20/401* (2013.01)

(58) Field of Classification Search
CPC . G06Q 20/322; G06Q 20/3223; G06Q 20/401
USPC .................................................. 705/4, 35–45
See application file for complete search history.

(56) References Cited

U.S. PATENT DOCUMENTS

| | | | | |
|---|---|---|---|---|
| 8,838,477 | B2* | 9/2014 | Moshfeghi | G06Q 20/3278 705/14.58 |
| 8,905,303 | B1* | 12/2014 | Ben Ayed | G06Q 20/32 235/380 |
| 2005/0114262 | A1 | 5/2005 | Howard | |
| 2006/0270421 | A1 | 11/2006 | Phillips et al. | |
| 2009/0182630 | A1* | 7/2009 | Otto | G06Q 20/20 705/14.1 |
| 2010/0078471 | A1* | 4/2010 | Lin | G06Q 40/02 235/379 |
| 2010/0082481 | A1* | 4/2010 | Lin | G06Q 40/00 705/41 |
| 2012/0290376 | A1* | 11/2012 | Dryer | G06Q 20/02 705/14.23 |
| 2012/0316963 | A1 | 12/2012 | Moshfeghi | |

OTHER PUBLICATIONS

International Search Report and Written Opinion for International Application No. PCT/US2016/025354 filed Mar. 31, 2016.
European Extended Search Report issued in EP Patent Application No. 16774238.6, dated Sep. 3, 2018, 9 pages.
Nordstrom E et al: "Robust and flexible Internet connectivity for mobile ad hoc networks", Ad Hoc Networks, Elsevier, Amsterdam, NL, [Online] vol. 9, No. 1, Apr. 2, 2010 (Apr. 2, 2010), pp. 1-15, XP027219148.
Wikipedia: "ISO 8583" Jan. 20, 2015 (Jan. 20, 2015), XP055500752, Retrieved from the Internet: URL:https://en.wikipedia.org/w/index.php?t itle=ISO 8583&oldid=643350014 [retrieved on Aug. 20, 2018], 12 pages.
Wireless Special Interest Group (sig) Pci Security Standards Council: "Information Supplement: PCI DSS Wireless Guidelines Standard: PCI Data Security Standard (PCI DSS)", Aug. 25, 2011 (Aug. 25, 2011), XP055423486, Retrieved from the Internet: URL:https://www.pcisecuritystandards.org/p dfs/PCI_DSS_v2_Wireless_Guidelines.pdf [retrieved on Nov. 9, 2017], 34 pages.
Chinese Office Action (with English language translation) for App No. CN201680020227.X, dated Jan. 20, 2020, 10 pages.
European Patent Office Communication pursuant to Article 94(3) EPC for Application No. EP16774238.6, dated Mar. 27, 2020, 7 pages.

* cited by examiner

PEER-TO-PEER MOBILE DEVICE PAYMENT NETWORK

CROSS-REFERENCE TO RELATED APPLICATIONS

This application claims priority to and the benefit of International Patent Application No. PCT/US2016/025354, filed Mar. 31, 2016, which claims priority to and the benefit of U.S. Provisional Application No. 62/140,653, filed Mar. 31, 2015, the entirety of which are incorporated by reference herein.

BACKGROUND

In some situations, access to a payment processing network may not be possible. For example, a secure wireless connection may not be available which may be necessary to complete a transaction such as when a user does not have cellular coverage in a location and when there is otherwise no other data connection available. At the same time, however, another user may have access to a secure wireless connection such as when the second user has cellular coverage in a particular location and the first user does not have cellular coverage. It would be useful for the first user to be able to use the secure wireless connection of the second user to access a payment network.

SUMMARY

In an embodiment, the disclosure describes a computer-implemented method of communicating payment data. The method includes receiving at a server, via a digital communication network, payment data transmitted from a first computing device that is connected to a peer-to-peer network and not in direct communication with the server. The payment data is received directly from a first peer computing device that is in communication with the peer-to-peer network and the server. The method also includes, at the server, analyzing, via one or more processors, the payment data to determine a payment response message. The method also includes transmitting from the server, via the digital communication network, the payment response message to a second peer computing device that is in communication with the server and in communication with the peer-to-peer network. The payment response message is communicated from the second peer computing device to the first computing device through the peer-to-peer network.

In another embodiment, the disclosure describes computer-implemented method of communicating payment data. The method includes establishing communication with a peer-to-peer network, wherein the peer-to-peer network comprises a plurality of peer computing devices. At least one of the plurality of peer computing devices is in communication with a payment server. The method also includes transmitting payment data to a first peer computing device of the plurality of peer computing devices, wherein the at least one peer computing device in communication with the payment server transmits the payment data to the payment server. The method also includes receiving a payment response message from the payment server via the peer-to-peer network.

In another embodiment, the disclosure describes a computer-implemented method of communicating with a payment server. The method includes initiating a payment transaction using a payment device, and establishing wireless communication with a first peer computing device on a peer-to-peer network comprising a plurality of peer computing devices. The method includes transmitting a request for authorization of the payment transaction to the first peer computing device. The first peer computing device is configured to transmit the request for authorization to a second peer computing device of the plurality of peer computing devices, and the second peer computing device is configured to transmit the request for authorization to the payment server. The method also includes receiving, in response to the request for authorization, a payment authorization from the payment server, and completing the payment transaction.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
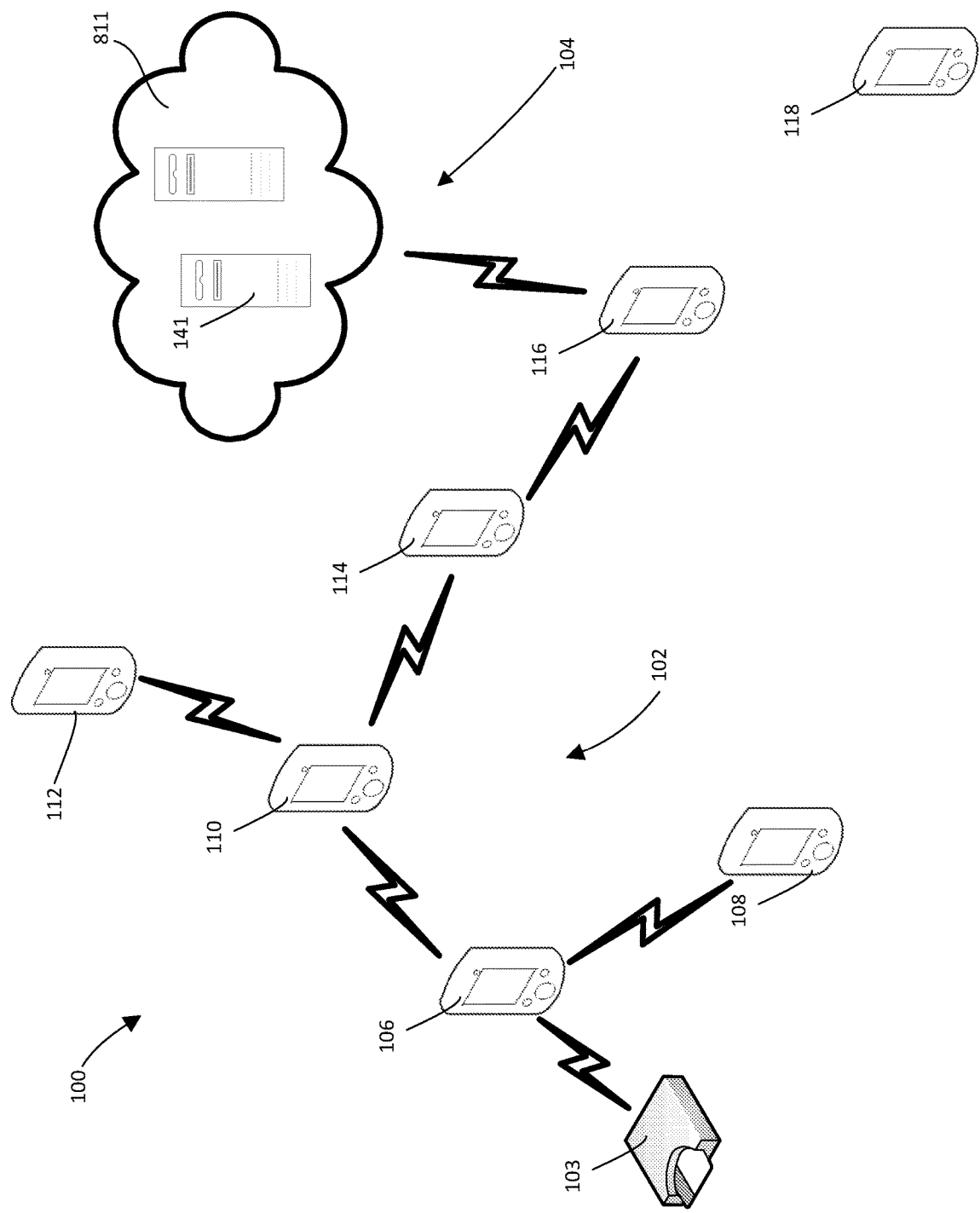
FIG. 1 is a high level illustration of the devices in the system.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present disclosure now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the example embodiments may take the form of an entirely hardware embodiment, an entirely software embodiment, or an embodiment combining software and hardware aspects. The following detailed description is, therefore, not to be taken in a limiting sense.

The example embodiments may overcome problems that occur when using wireless cellular or other wireless devices that can send and receive data over a digital communication network. Access to cellular and other wireless data services can vary depending on location, time, and other factors. Additionally, access to cellular and other wireless data services can vary from device to device, depending on a variety of factors including the specific type of the device, the age of the device, and the cellular or wireless data carrier by which the computing device accesses wireless data. For this reason, a user may, at certain times or in certain places, be unable to complete wireless transactions on a first computing device, but another user with another computing device may be able to access the wireless data service needed to complete a transaction or other form of wireless data transfer or communication. The example embodiments overcome these issues using a peer-to-peer mobile device payment network.

FIG. 1 illustrates, at a high level, an embodiment of a system 100 for implementing embodiments of the peer-to-peer device payment network 102 described herein. The system 100 can, in some embodiments, include one or more peer-to-peer networks 102 enabling one user to reach at least one other user that has access to a payment processing network 104. The payment processing network 104 can include a single server 141 or can multiple servers making up a cloud of servers 111, each of which or as a group are configured to process payment data received from a computing device on the peer-to-peer network 102 via a digital communications network. The server 141 or cloud of servers can be administered, for example, by a payment card issuer, bank, or any other payment service. If a first computing device does not have access to the payment network 104, the first computing device may employ peer-to-peer networks to reach an additional user that does have access to the payment network. For example, FIG. 1 illustrates multiple computing devices 106, 108, 110, 112, 114, 116, and 118, which make up, at least in part, the peer-to-peer network 102. The individual connections between the computing devices 106-118 that can make up the peer-to-peer network 102 can be any suitable wireless or wired connection that permits the transfer of data from one computing device to another. For example, the connections between computing devices 106-118 can be via Bluetooth, near field communication (NFC), Wi-Fi (802.11 standard), USB cable, etc. It should be understood that the devices that make up the peer-to-peer network can change continuously as computing devices are moved in and out of network connection and connection with other computing devices. For example, in FIG. 1, computing device 118 is not currently in wireless connection with the other computing devices 106-116 on the peer-to-peer network, the computing device 118 could become connected at a later time and thus become part of the network.

In some embodiments, a first computing device 106 can be connected, either wirelessly or otherwise, to a payment device 103. Although the payment device 103 shown in FIG. 1 is separate from the first computing device 106, it is contemplated herein that the payment device could alternatively be a part of the first computing device, such as an application or hardware component. During a purchase transaction, the payment device 103 can generate payment data to be transmitted to the payment network 104 for processing, such as for confirmation of funds available, etc. In some embodiments, if the first computing device 106 does not have independent access to the payment network 104, the first computing device 106 may communicate the payment data to other computing devices 108-116 on the peer-to-peer network 102. The payment data can then be communicated through the peer-to-peer network 102 until a connected computing device 116 is reached that has access to the payment network 104. The payment network 104 may communicate a return message to the connected computing device 116 who may then access the peer-to-peer network 102 to communicate the return message to the first computing device 106. Thus, a transaction may be completed even though the first computing device 106 does not have independent payment network access.

Figure 2:
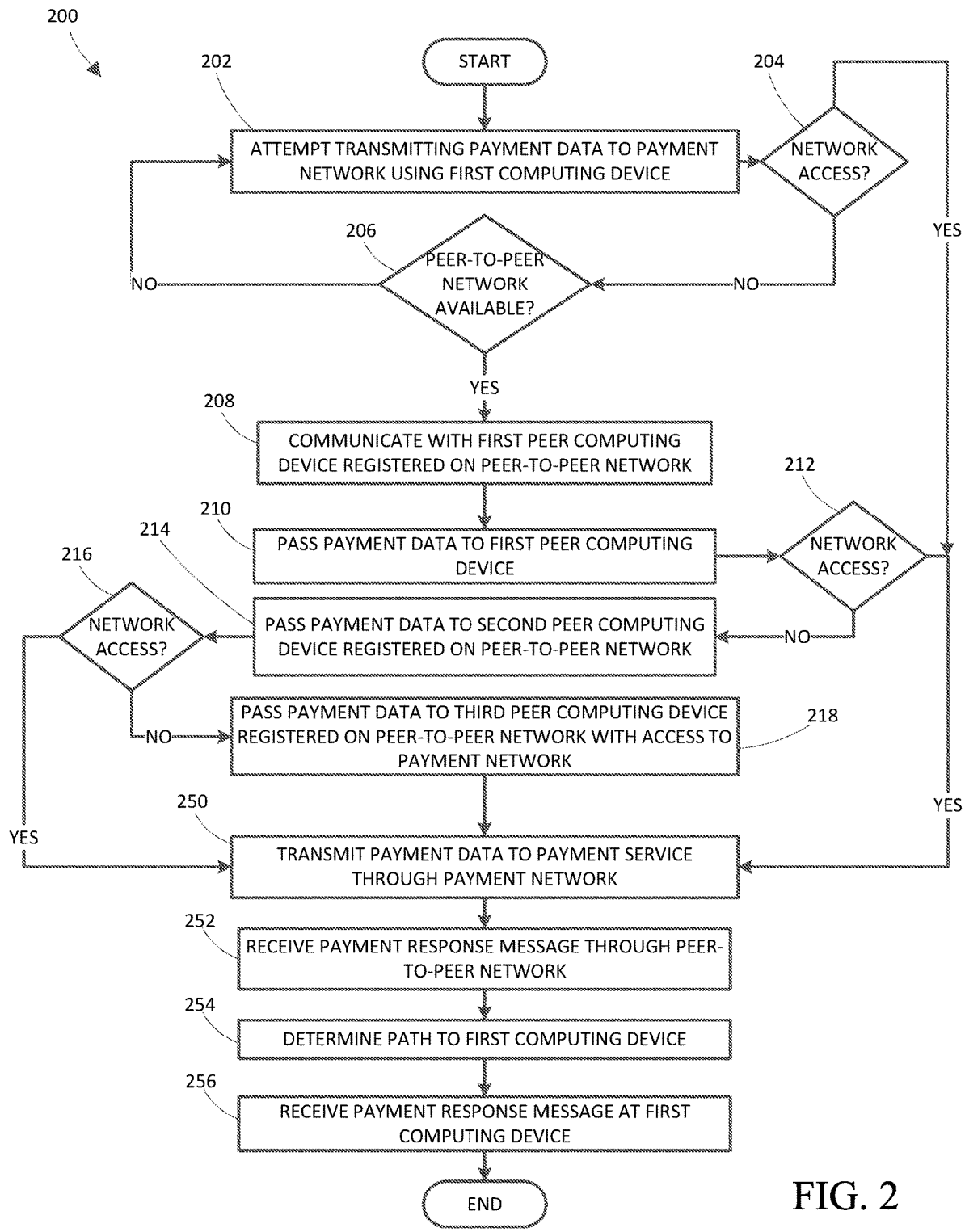
FIG. 2 is an illustration of a blocks of computer executable code that physically configure a processor to use a peer-to-peer network to communicate to a payment network.

FIG. 2 shows an embodiment of a method 200 of communicating the payment data through the peer-to-peer network 102 to and/or from the payment network 104. At block 202, a first computing device, such first computing device 106 in FIG. 1, may attempt to communicate a payment related message to a remote network receiver and a payment network. For example, a vendor at a swap meet or at a remote location with poor wireless service may attempt to swipe a card using a card swipe device, such as the payment device 103 in FIG. 1, in communication with a portable computing device such as a smart phone or a traditional cellular phone. In such a scenario, the vendor may desire a payment authorization for a payment, such as a credit card authorization. Similarly, a consumer or merchant may use a payment application on a computing device such as a portable computing device and the payment data may need to be authorized before a transaction may proceed.

As is only too well known, cellular access may be inconsistent and completely unavailable in some locations to some users depending on a variety of factors. For example, a first cellular service may not have any coverage in a given location. In addition, a portable computing device of a user may have a low battery and may not have the power necessary to reach a remote network receiver while a portable computing device with additional power may be able to reach the remote network receiver. Further, some portable computing devices only use the GSM cellular standard while other portable computing devices may use the CDMA cellular standard while yet additional computing devices may only have Wi-Fi capabilities. Thus, in many situations, one user using a computing device may have access to a remote network receiver while another user using another computing device in very close proximity may not have access to the remote network receiver.

At block 204, it may be determined whether first computing device has network access. The portable computing device may have an input/output circuit in communication with an antenna and the portable computing device may periodically search for signals from networks in known frequency ranges. For example, a portable computing device may search for signals in the Wi-Fi range and in the cellular range but may not search for signals in the police band range. The portable computing device may analyze the signals and determine if a network is available. In the payment network is available, the first computing device can, at block 250, transmit the payment data directly to the payment service through the payment network without using the peer-to-peer network.

Figure 3:
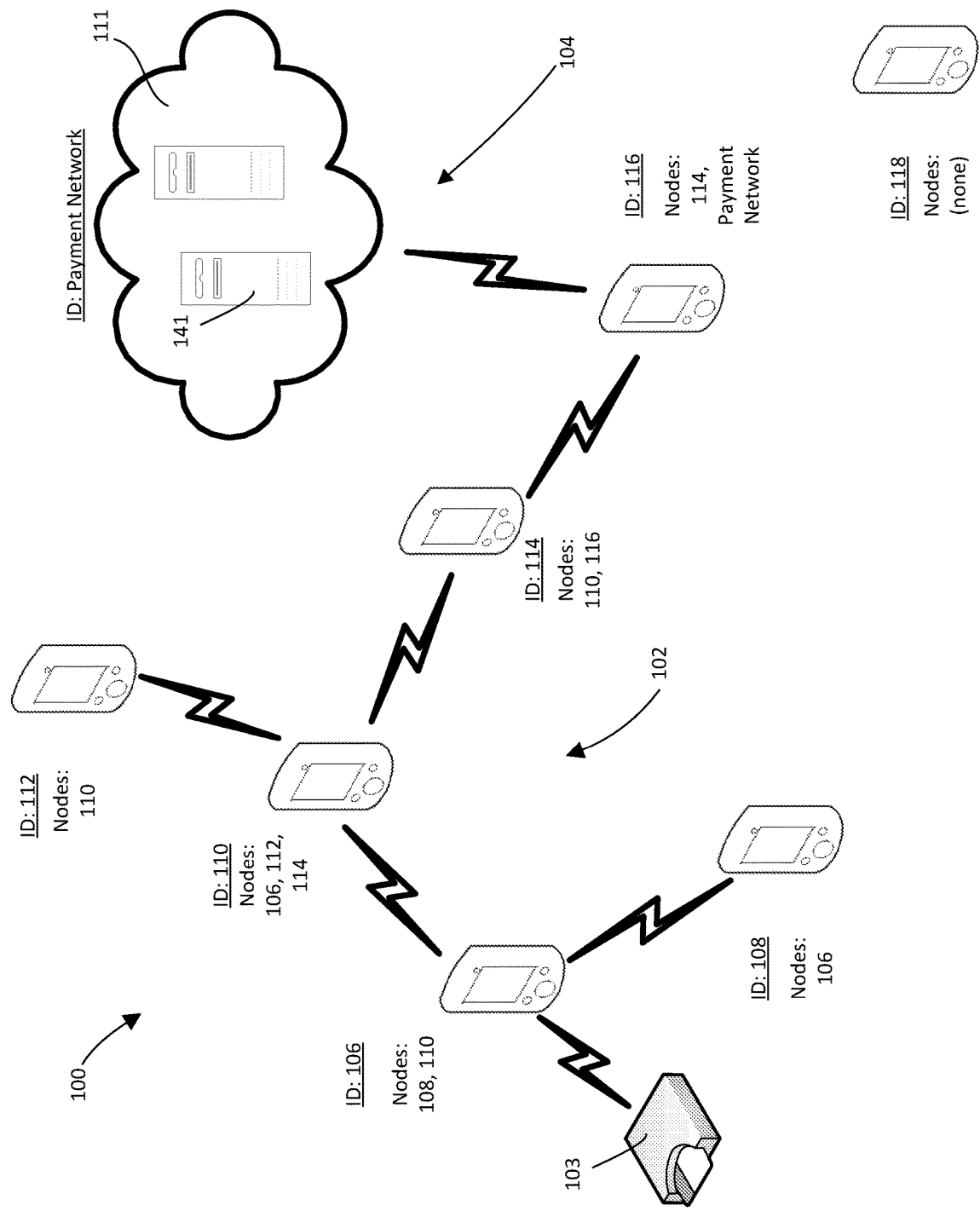
FIG. 3 is an illustration of the message hops through the system.

At block 206, if the first computing device determines at block 204 that the first computing device does not have network access to a payment network, it may determine if a peer-to-peer network is available, such as peer-to-peer network 102 in FIG. 1. The peer network may be as simple as a single additional portable peer computing device in the nearby vicinity, or it may be a plurality of portable peer computing devices. The peer-to-peer network may be set up and operate in a variety of ways. In some embodiments as illustrated by FIG. 3 and described below, each peer computing device may periodically communicate a heartbeat signal and nodes that are able to receive the signal may track the available nodes in a contact list in a memory. In a further embodiment, computing devices at nodes may communicate their own contact list to other peer computing devices at other nodes, either automatically or on demand. Whether any of the computing devices at any of the nodes has network access also may be communicated.

If, at block 206, the first computing device at a node determines it has peer-to-peer (p2p) communications available at block 120. If no peer-to-peer network is available, the first computing device can return to block 202 to continue attempting to connect to a payment network. If, however, the first computing device determines that a peer-to-peer network is available, the first computing device, at block 208, may communicate to a first peer computing device it knows is registered on peer-to-peer network, such as peer computing device 108 in FIG. 1. Peer computing devices can be any computing device in connection on the peer-to-peer network, such as computing devices 108-116 in FIG. 1. The first peer computing device may be any suitable computing device with an antenna and an input/output circuit that is tuned to receive signals in the desired frequency. In some embodiments, peer computing devices may be portable computing devices, such as a smart phones. In other embodiments, a peer computing device may be a repeater or a desktop computing device configured to receive the desired signals.

The peer-to-peer communication may occur in a variety of ways which may be used together or separately. For example, in some embodiments, cellular communication directly between portable computing devices may be possible even without the cellular signal being routed through the traditional cellular system. Similarly, direct Wi-Fi communication between portable computing devices may be possible. Of course, other communication methods may be employed such as direct SMS messages, direct social media communication platform messages, HTML based messages, direct infrared methods, etc., all of which may be used alone or in combination. A protocol may be used to ensure the communications are understood and are secure. Part of the protocol may involve establishing trust between the nodes and may include using shared key type encryption or other secure forms of communication.

At block 210, the payment data may begin to hop through the peer-to-peer network by passing the payment data from the first computing device to the first peer computing device. As mentioned previously, computing devices at nodes may periodically communicate a heartbeat type signal such that other computing devices at other nodes will know the other nodes that are available for communication. In some embodiments, such as the embodiment illustrated in FIG. 3, tables may be kept for each base node and the peer nodes that are in communication with the base node. In the illustrated embodiment, the node bearing the label ID 106 is the base node, and the other nodes in the system 100 are peer nodes with ID 108, 110, 112, 114, 116, and 118. The example tables in FIG. 3 illustrate which adjacent nodes with which a particular node is in known communication. It should be understood that these nodes can change continuously. For example, in the snapshot of a peer-to-peer network 102 shown in FIG. 3, the base node with ID 106 currently can connect to computing devices at the two adjacent nodes with ID 110 and ID 108. Also in the illustrated embodiment, the computing device at the node with ID 118 has no current peer connections, and the computing device at node ID 116 is connected to a peer node as well as the payment network, each connection of which is logged in the table for reference. In this embodiment, more overhead may be created by requiring the tracking of many bases nodes and additional nodes in communication with the base node. Using the tables, it may be easy to map a path from the base node to the additional nodes.

In other embodiments, a table may be kept of immediately available nodes featuring connected peer computing devices. In order to communicate with additional nodes, the first computing device at a base node may "flood" or send out a plurality of messages to the various known nodes in the hopes that the message will be passed from node to node to its final destination. In some embodiments, an authority node (not shown) may keep the table of nodes and connections and the authority node may route communications in an efficient manner.

In some embodiments, the peer-to-peer network may operate on an acknowledgement system such that the sending node may receive an acknowledgement when the message eventually reaches its intended receiving node. In some additional embodiments, the peer-to-peer network may use acknowledgements at each node hop as peer-to-peer networks can change quickly, such as when a node suddenly moves out of range, turns off, or otherwise becomes obsolete.

At block 212, if the first peer computing device at the additional node has network access, the payment data can be transmitted to the payment service through the payment network at block 250. If the first peer computing device does not have network access, the additional node may pass the message to further additional peer computing devices at further additional nodes. In some embodiments, the payment data may be passed from one peer-to-peer network to another peer-to-peer network using a common node. As mentioned previously, a table may be available to direct the path of the message toward an additional node with network access. In other embodiments, a table may not be available and the payment data may have to be passed in a more random fashion until a further additional node is reached that has network access.

In the example embodiment illustrated in FIG. 2, if the first peer computing device is determined not to have network access at block 212, the first peer computing device can pass the payment data to a second peer computing device registered on the peer-to-peer network at block 214, if such a peer computing device is available.

Similar to the first peer computing device, the second peer computing device may, at block 216, determine if network access to the payment network is available. If so, the payment data can be transmitted to the payment service through the payment network at 250. If not, at block 218, the payment data can be passed to a third peer computing device at a further additional node that has network access. Then, at block 250, the payment data may be communicated through the payment network to the payment system and a payment service. Although not explicitly illustrated in FIG. 2, if at any time it is determined that an additional peer computing device is unavailable, the payment data can be returned to the first computing device with a failure notification, or each connected computing device can continue attempts to connect to the payment network or other peer computing devices in the peer-to-peer network until connection to the payment network is achieved.

The communication between nodes in the peer-to-peer network may be in a first communication format and the communication between the nodes and the payment service may be in a second format. For example, the peer-to-peer communication may follow a peer-to-peer protocol over Wi-Fi and the communication from the node and the payment system may use a cellular protocol or vice versa. In some embodiments, the portable computing device may be in secure communication with the server such that the data back and forth to the payment network may be secure.

Logically, the payment service may be in communication with a payment authorization network and the communication on the payment network may follow the payment network protocol. The proposed transaction may be reviewed by the payment service for fraud and for approval (sufficient credit, proper credentials, etc.) Further, issuing banks and merchant processors may be included as part of the transaction on the payment network.

At block 252, a payment response message may be communicated to a computing device at a receiving node with network access that also is part of one or more peer networks. In some embodiments, the payment response message may proceed to the receiving node that sent the original request message. In other embodiments, the response may be communicated to a different node. In all embodiments, it may be useful to communicate the payment response message to a node that is believed to have communication with the original node that started the transaction. In some situations, links of the peer-to-peer network can break and the access to the original node may follow a new path or may fail altogether. In such situations, a repeated request for an authorization may occur or a request for an acknowledgement may not be answered. In some embodiments, the decision may be either an authorization or a decline for the transaction. The payment response message can be, for example, a confirmation of funds, a payment authorization, etc.

In some embodiments, at block 254, the computing device at the receiving node may determine a path to first computing device. As mentioned previously, in some embodiments as in FIG. 3, the path may be determined by reviewing tables stored at the receiving node. In other embodiments, the path may not be known but an educated guess may be made regarding a next node. The educated guess may be made on node identification such as if the request node has been assigned number 105, it may make logical sense to communicate the message to node 110 rather than node 650 as node 105 is numerically closer to node 110 than node 650.

In yet an additional embodiment, the receiving node may have no idea of the most efficient route and may flood all known nodes on the peer-to-peer network with the understanding that the continued flooding of the message across the peer-to-peer network will ensure that the message will eventually get to the desired node. In some embodiments, the peer-to-peer network may use an acknowledgement system such that the originally sending node may receive an acknowledgement that the desired node safely received the message in a timely manner otherwise the message may be repeated.

At block 256, the response message may be transmitted from the receiving node to an additional node on the peer-to-peer network and eventually back to the first computing device at the base node. As mentioned previously, the return path to the base node may be different than the original sending path. For example, there may be m hops to reach the computing device to communicate with the server and there are n hops to reach the computing device from the server where m does not equal n. In addition, several peer-to-peer networks may be used with the message crossing peer-to-peer networks using a common node, The responding message may communicate along the peer-to-peer network to the first computing device. As mentioned previously, the message may be an authorization message and the transaction may proceed. If the message is a denial, the transaction may end.

The disclosed system and method may have several uses. In instances where network coverage is inconsistent or non-existent for a user, the user may be able to use peer-to-peer networking to access the internet or another outside network if another computing device is on the peer-to-peer network and has outside network access. In situations where outside network access is expensive or just hard to reach, transactions may still be submitted and approved even if the seller does not have outside network access. As a result, transactions which would not have occurred in the past will now occur.

Figure 4:
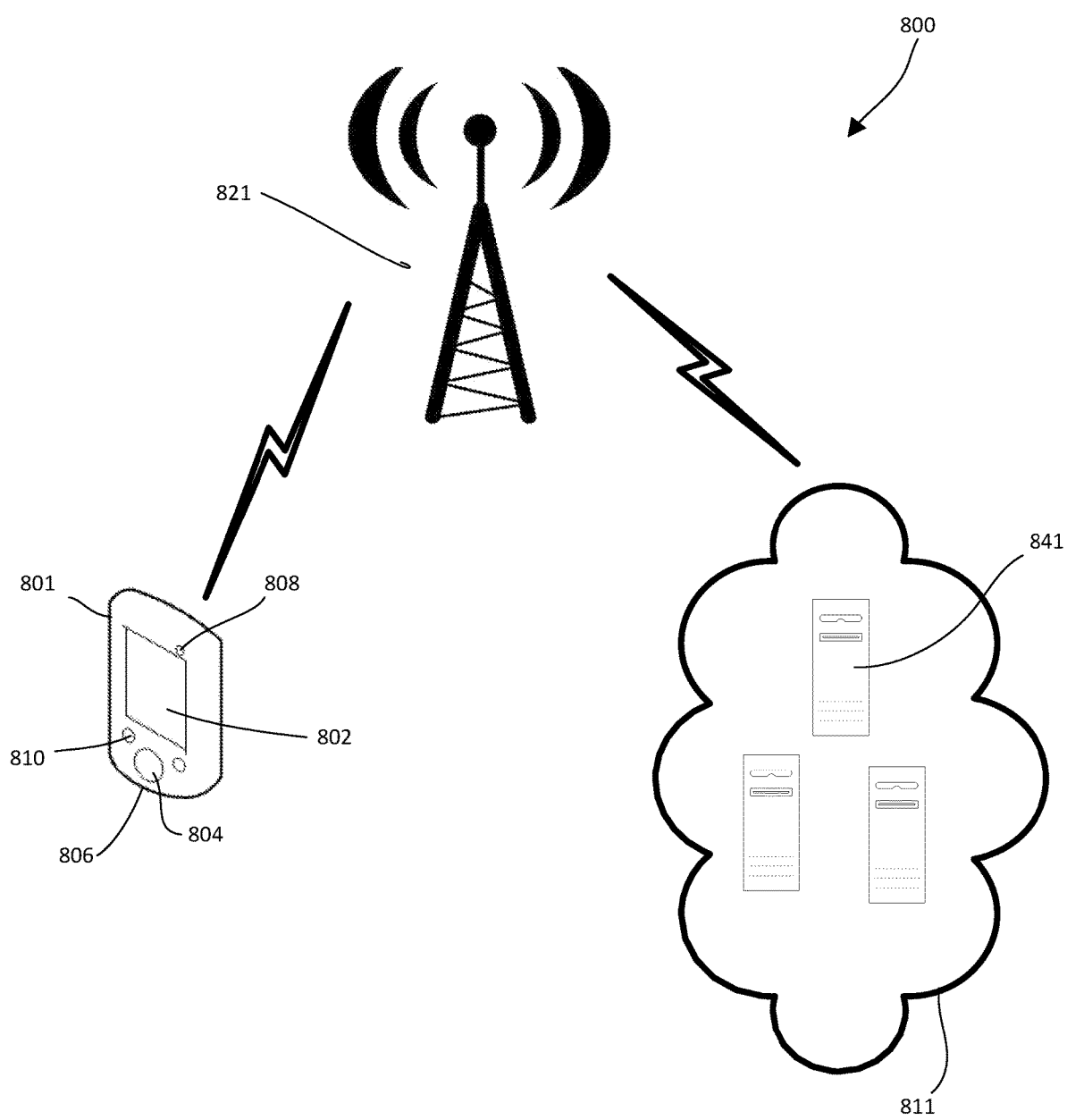
FIG. 4 is an illustration of a portable computing device using a communication system to communicate with a payment system.

FIG. 4 may be a high level illustration of some of the elements a sample computing system 800 that may be physically configured to implement the method and system. The computing system 800 may be a dedicated computing device 841, a dedicated portable computing device 801, an application on the computing device 841, an application on the portable computing device 801 or a combination of all of these. FIG. 4 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a device that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 821 such as cellular service, through the Internet, through a private network, through Bluetooth, etc. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

Figure 5:
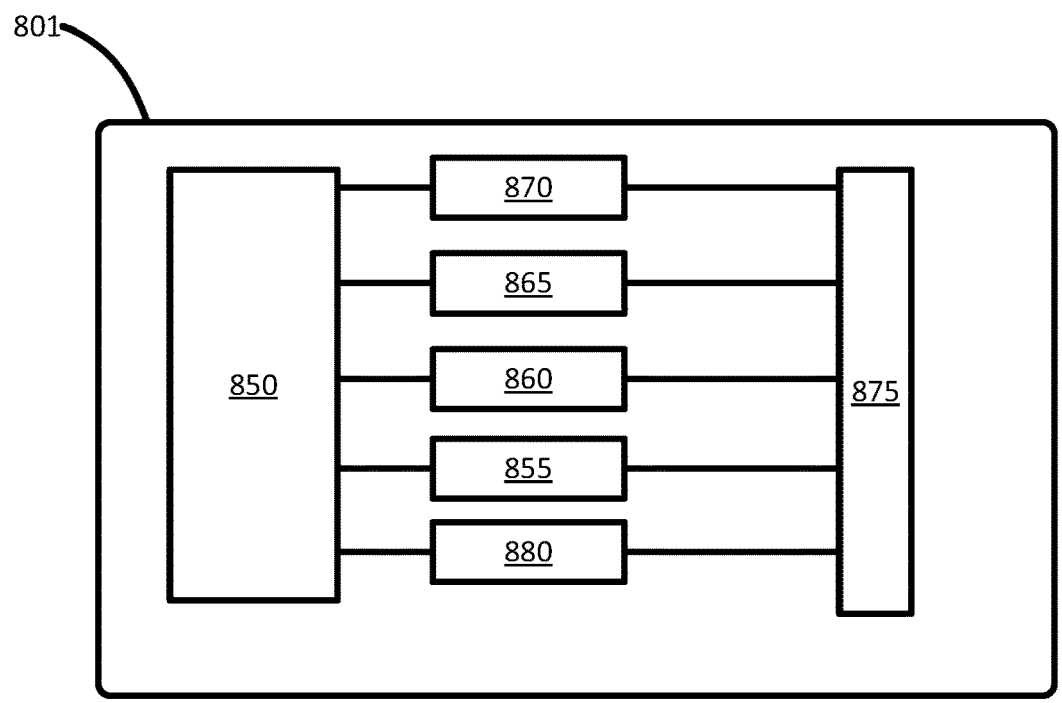
FIG. 5 is an illustration of a portable computing device.
Figure 6:
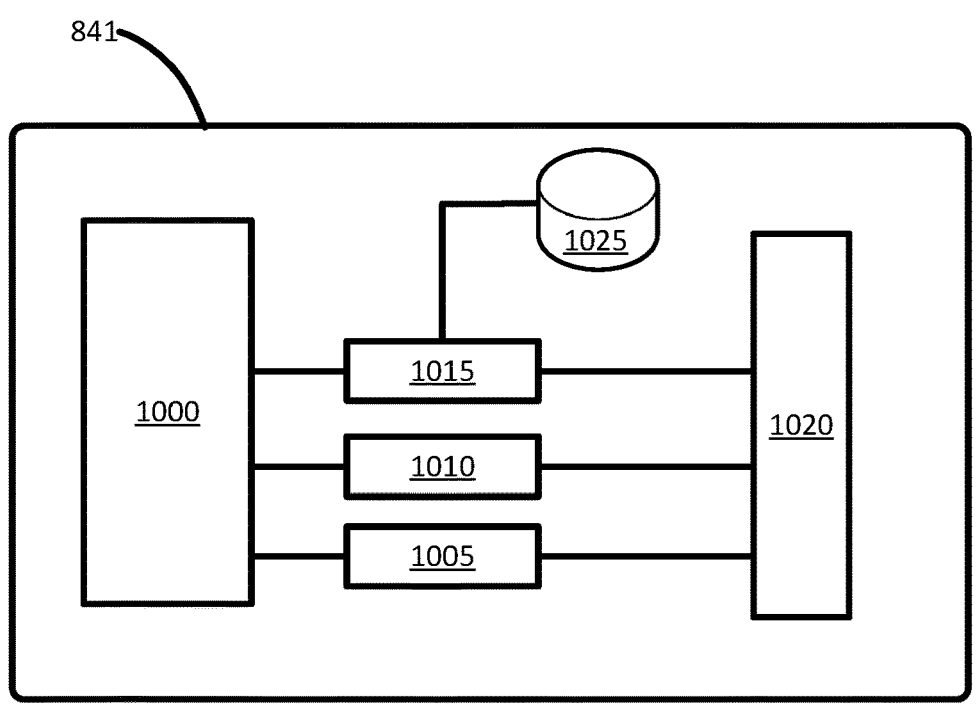
FIG. 6 is an illustration of a server type computing system.

FIG. 5 may be a simplified illustration of the physical elements that make up a portable computing device 801 and FIG. 6 may be a simplified illustration of the physical elements that make up a server type computing device 841. FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs 802, etc. It also may control communicating with the networks, either through wireless or wired devices. Of course, this is just one embodiment of the portable computing device 801 and the number and types of portable computing devices 801 is limited only by the imagination.

The physical elements that make up the remote computing device 841 may be further illustrated in FIG. 5. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud 811 of computing device 841 and may be stored in a distributed manner across a plurality of computing devices 841. There also may be an input/output bus 1020 that shuttles data to and from various user input devices. The input/output bus 1020 also may control of communicating with the networks, either through wireless or wired devices. In some embodiments, the application may be on the portable computing device 801 and in other embodiments, the application may be remote on the server 841. Of course, this is just one embodiment of the server 841 and the number and types of portable computing devices 841 is limited only by the imagination.

As a result of the peer-to-peer mobile device payment network and system, merchants may be able to sell items in locations that were inaccessible previously. As a result, merchants may make more sales and users and merchants may use payment services more frequently. The system disclosed herein is more than just speeding a process, but instead uses a computing system to achieve a new and better outcome. For example, the system makes payments does not merely make payments faster, it makes payments possible that would otherwise not be possible without the system.

The computing devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The computing devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The computing devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated. The attached Appendix may provide more detail regarding the operation of a payment system.

The present disclosure provides a solution to the long-felt need described above. In particular, the systems and methods described herein may be configured for improving payment systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method of communicating payment data, the method comprising:
periodically receiving, by a wireless computing device associated with a merchant, a wireless heartbeat signal from at least one of a plurality of peer computing devices, the plurality of peer computing devices at least in part making up a peer-to-peer network wherein at least one of the plurality of peer computing devices is a connected device that is in communication with a payment server;
based on receiving each of the at least one wireless heartbeat signal, updating, on the wireless computing device, a table of nodes to include a node identifier for each of the at least one peer computing device from which the at least one wireless heartbeat signal has been received within a predetermined time period and removing a node identifier for each of the at least one peer computing device from which the at least one wireless heartbeat signal has not been received within the predetermined time period, the table of nodes including an immediately available set of peer computing devices of the plurality of peer computing devices;
initiating, via the wireless computing device, a payment transaction with a customer;
in response to initiating the payment transaction, analyzing, by the wireless computing device, wireless signals to determine whether a known network is available to the wireless computing device;
if the known network is available, controlling the wireless computing device to automatically transmit payment data associated with the payment transaction to the payment server via the known network to initiate a transaction;
if the known network is not available to the wireless computing device:
querying the table of nodes to determine the immediately available set of peer computing devices,
automatically transmitting, by the wireless computing device, the payment data to each peer computing device of the immediately available set of peer computing devices,
wherein each respective peer computing device of the immediately available set of peer computing devices queries a table of nodes associated with that device and transmits the payment data to each peer computing device of an immediately available set of peer computing devices, and
wherein the at least one connected device in communication with the payment server receives the payment data from at least one of the plurality of peer computing devices and transmits the payment data to the payment server to initiate the transaction; and
receiving, by the wireless computing device, a payment response message from the payment server via the peer-to-peer network.

2. The method of claim 1, wherein each of the at least one wireless signal includes an updated table of nodes from the peer computing device providing the wireless signal.

3. The method of claim 1, wherein the payment response message is one of an approval or a denial of a transaction.

4. The method of claim 1, wherein payment data may include a request for authorization.

5. A computer-implemented method of communicating with a payment server, the method comprising:
periodically receiving, by a wireless computing device associated with a merchant, a wireless heartbeat signal from at least one of a plurality of peer computing devices, the plurality of peer computing devices at least in part making up a peer-to-peer network wherein at least one of the plurality of peer computing devices is a connected device in communication with a payment server;

populating, by the wireless computing device, a table of nodes including a node identifier associated with each peer computing device of the plurality of peer computing devices from which the computing device has received a wireless heartbeat signal within a predetermined amount of time, and removing a node identifier for each of the at least one peer computing device from which the at least one wireless heartbeat signal has not been received within the predetermined amount of time;

periodically receiving, by the wireless computing device, a wireless signal from a first peer computing device of the plurality of peer computing devices, the wireless signal including a first peer table of nodes including at least a second node identifier for a second peer computing device indicating that the first peer computing device is in communication with the second peer computing device;

based on the wireless signal from the first computing device, updating, on the wireless computing device, the table of nodes to include the first and second node identifiers;

initiating, via the wireless computing device, a payment transaction with a customer;

in response to initiating the payment transaction, analyzing, by the wireless computing device, wireless signals to determine whether a known network is available to the wireless computing device;

if the known network is available, controlling the wireless computing device to automatically transmit a request for authorization of the payment transaction to the payment server via the known network;

if the known network is not available to the wireless computing device:
  based on the table of nodes, mapping, by the wireless computing device, a wireless communication path from the wireless computing device to the connected device via at least the first and second peer computing devices, and
  automatically transmitting, by the wireless computing device, the request for authorization of the payment transaction along the mapped wireless communication path to the connected device, wherein the connected device is configured to transmit the request for authorization to the payment server;

receiving, at the wireless computing device and in response to the request for authorization, a payment authorization from the payment server; and controlling the wireless computing device to complete the payment transaction based on receiving the payment authorization.

6. The method of claim 5, wherein receiving the payment authorization includes receiving the payment authorization via at least one of the plurality of peer computing devices on the peer-to-peer network.

7. The method of claim 5, further comprising receiving a wireless signal including a respective table of nodes for each of the plurality of peer computing devices from which the wireless computing device has received a wireless heartbeat signal within the predetermined amount of time.

8. The method of claim 5, wherein the plurality of peer computing devices in the peer-to-peer network each maintain a routing table of other active peer computing devices.

9. The method of claim 5 further comprising periodically searching, by the wireless computing device, for wireless heartbeat signals from the plurality of peer computing devices on the peer-to-peer network.

10. The method of claim 1, wherein the plurality of peer computing devices in the peer-to-peer network each maintain a routing table of other active peer computing devices.

11. The method of claim 1 further comprising periodically searching, by the wireless computing device, for wireless heartbeat signals from the plurality of peer computing devices on the peer-to-peer network.

12. A wireless computing device comprising:
at least one processor, and
at least one memory storing computer executable instructions that, when executed by the at least one processor, cause the apparatus at least to perform the steps of:
periodically receiving, by the wireless computing device, a wireless heartbeat signal from at least one of a plurality of peer computing devices, the plurality of peer computing devices at least in part making up a peer-to-peer network wherein at least one of the plurality of peer computing devices is a connected device that is in communication with a payment server;

based on receiving each of the at least one wireless signal, updating, on the wireless computing device, a table of nodes to include a node identifier for each of the at least one peer computing device from which the at least one wireless heartbeat signal has been received within a predetermined time period and removing a node identifier for each of the at least one peer computing device from which the at least one wireless heartbeat signal has not been received within the predetermined time period, the table of nodes including an immediately available set of peer computing devices of the plurality of peer computing devices;

initiating, via the wireless computing device, a payment transaction with a customer of a merchant associated with the wireless computing device;

in response to initiating the payment transaction, analyzing, by the wireless computing device, wireless signals to determine whether a known network is available to the wireless computing device;

if the known network is available, controlling the wireless computing device to automatically transmit payment data to the payment server via the known network;

if the known network is not available to the wireless computing device:
  querying, by the wireless computing device, the table of nodes to determine the immediately available set of peer computing devices;
  automatically transmitting, by the wireless computing device, the payment data to each peer computing device of the immediately available set of peer computing devices,
  wherein each respective peer computing device of the immediately available set of peer computing devices queries a table of nodes associated with that device and transmits the payment data to each peer computing device of an immediately available set of peer computing devices, and
  wherein the at least one connected device in communication with the payment server receives the payment data from at least one of the plurality of peer computing devices and transmits the payment data to the payment server to initiate the transaction; and receiving, by the wireless computing device, a payment response message from the payment server via the peer-to-peer network.

13. The wireless computing device of claim 12, wherein each of the at least one wireless signal includes an updated table of nodes from the peer computing device providing the wireless signal.

14. The wireless computing device of claim 12, wherein the payment response message is one of an approval or a denial of a transaction.

15. The wireless computing device of claim 12, wherein payment data may include a request for authorization.

* * * * *